(12) United States Patent
Yamakawa et al.

(10) Patent No.: US 7,588,635 B2
(45) Date of Patent: Sep. 15, 2009

(54) HYDRAULIC COMPOSITION

(75) Inventors: Tsutomu Yamakawa, Joetsu (JP); Yoshiaki Sasage, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/032,078

(22) Filed: Feb. 15, 2008

(65) Prior Publication Data

US 2008/0196629 A1    Aug. 21, 2008

(30) Foreign Application Priority Data

Feb. 19, 2007   (JP) .............................. 2007-038220

(51) Int. Cl.
*C04B 16/02* (2006.01)
*C04B 24/10* (2006.01)

(52) U.S. Cl. .................... 106/805; 106/172.1; 106/696; 106/730; 106/780

(58) Field of Classification Search .............. 106/172.1, 106/696, 730, 780, 805
See application file for complete search history.

(56) References Cited

U.S. PATENT DOCUMENTS

| | | | | |
|---|---|---|---|---|
| 4,707,188 | A * | 11/1987 | Tsuda et al. | 106/639 |
| 6,811,605 | B2 * | 11/2004 | Sasage et al. | 106/805 |
| 6,841,232 | B2 * | 1/2005 | Tagge et al. | 428/304.4 |
| 6,893,497 | B2 * | 5/2005 | Einfeldt et al. | 106/804 |
| 6,902,797 | B2 * | 6/2005 | Pollock et al. | 428/304.4 |
| 2005/0241541 | A1 | 11/2005 | Hohn et al. | |
| 2006/0100355 | A1 * | 5/2006 | Waser et al. | 524/556 |

FOREIGN PATENT DOCUMENTS

| | | |
|---|---|---|
| DE | 3 909 070 A1 | 9/1990 |
| GB | 1185594 A | 3/1970 |
| JP | 55-056057 A | 4/1980 |
| JP | 60-103059 A * | 6/1985 |
| JP | 63-074945 A | 4/1988 |
| JP | 10-231165 A | 9/1998 |
| JP | 2000-103662 A | 4/2000 |
| JP | 2000-128617 A | 5/2000 |
| JP | 2000-203915 A | 7/2000 |

OTHER PUBLICATIONS

J. G. Coblar et al., "Determination of Alkyl Cellulose Ethers By Gas Chromatography", Talanta, 1962, vol. 9, pp. 473-480.
European Search Report dated Dec. 1, 2008, issued in corresponding European Patent Application No. 08 25 0555, Dec. 10, 2008.

* cited by examiner

*Primary Examiner*—Anthony J Green
(74) *Attorney, Agent, or Firm*—Westerman, Hattori, Daniels & Adrian, LLP.

(57) ABSTRACT

Hydraulic compositions comprising a setting accelerator, a water-soluble cellulose ether having a degree of alkyl substitution of 1.6 to 2.5 which is a water-soluble alkyl cellulose or a water-soluble hydroxyalkyl alkyl cellulose, and water are useful as self-leveling compositions having an excellent self-leveling capability, a minimal change with time of fluidity, and a short setting time, or as cement mortar compositions having a long open time and a short setting time.

4 Claims, No Drawings

HYDRAULIC COMPOSITION

CROSS-REFERENCE TO RELATED APPLICATION

This non-provisional application claims priority under 35 U.S.C. §119(a) on Patent Application No. 2007-038220 filed in Japan on Feb. 19, 2007, the entire contents of which are hereby incorporated by reference.

TECHNICAL FIELD

This invention relates to hydraulic compositions, and more particularly, to hydraulic compositions which are useful as self-leveling compositions having a self-leveling ability to be used as floor surface finish on concrete structures or applied to the top of continuous foundations in houses, as well as cement mortar compositions having a long open time and a short setting time and suited for tile attachment or the like.

Throughout the specification, the term "self-leveling" is often abbreviated as SL.

BACKGROUND ART

Owing to their self-leveling property, SL compositions are often used for the purposes of saving the labor and improving the efficiency involved in the operation of surface finish on concrete structures. They have gained rapid widespread use to replace the conventional mortar or concrete direct finish, mainly as the under-floor plaster-work-finish in buildings or the continuous foundation top leveler in houses. The SL compositions for use in these under-floor working and other methods include gypsum and cement based compositions.

There are included some SL compositions having a minimal change with time of fluidity and a fast setting time as the present invention aims. They are designed so as to control the relevant properties by the type and amount of water-reducing agent, the addition of a setting retarder, a combination of a setting accelerator with a setting retarder, or the like.

With respect to the cement-based SL compositions, JP-A 10-231165 discloses to adjust the pot life using a lithium salt as the setting accelerator and aluminum sulfate as the setting retarder at the same time. In this composition, the lithium salt such as lithium carbonate serves as the setting accelerator to alumina cement, and the aluminum sulfate has a set retardation effect to alumina cement, indicating the combined use of setting retarder and setting accelerator to the overall system. They have positive and negative effects on the pot life, respectively, so that the pot life may be controlled. However, since the resultant effect is largely governed by a proportion of two additives, it is difficult to meet both the pot life and the setting time.

JP-A 63-74945 relates to a method of adding cellulose ether to concrete or mortar. Post addition of a slurry of cellulose ether is disclosed therein. The water-soluble cellulose ether must be pre-treated with glyoxal and an acid such as an aliphatic carboxylic acid before it is dispersed and dissolved.

With respect to gypsum-based SL compositions, JP-A 55-56057 discloses to use type II anhydrous gypsum in combination with a setting accelerator such as potash alum and a setting retarder such as borax. Although the setting retarder is concomitantly used in order to establish a pot life, it is difficult to meet both contradictory parameters, pot life and setting time by adjusting the amounts of setting accelerator and retarder added.

For tile attachment, on the other hand, wet and dry methods are known. The wet method includes use of organic adhesives as well as ordinary cement-based mortar for tile attachment. The dry method includes retention by fixtures or the like. Of these, the cement-based mortar is most often used for tile attachment because of low cost, stable effect and durability. For the mortar for tile attachment, not only adhesion, but also the open time during which tiles can be attached (that is, pot life) are of significance. Additionally, a mortar having a short setting time is required to meet the current demand for more efficient working.

As the tile adhesive mortar having a long open time, for example, JP-A 2000-203915 discloses to add a combination of water-soluble cellulose ethers having different setting delay times in order to increase the open time. If a water-soluble cellulose ether having a long setting delay time is used alone, an open time is established, but the setting time is undesirably prolonged. The patent thus proposes to use it along with a water-soluble cellulose ether having a short setting delay time in order to control the setting time. This combination ensures a long open time, but the setting time is slowed, raising a problem against quick working.

JP-A 2000-103662 discloses an aqueous solution of surface-treated water-soluble cellulose ether having a viscosity at 35° C. which is limited to a certain range for preventing the aqueous solution from reducing its viscosity in summer or at high temperatures. Tile adhesive mortar using this aqueous solution, however, is not expected to have a longer open time and a shorter setting time. In JP-A 2000-128617, an open time is ensured using a water-soluble cellulose ether having a relatively long set retardation time and an algal water-soluble polymer having set retardation effect in combination. This method provides a noticeable set retardation effect and a long open time, but has the drawback of a long setting time.

Accordingly, there is a desire to have a tile adhesive mortar having a long open time (or long pot life) and a short setting time.

DISCLOSURE OF THE INVENTION

An object of the invention is to provide a hydraulic composition having a long pot life and a short setting time, which can serve as an SL composition having a minimal change with time of fluidity and a short setting time, or as a cement mortar composition having a long open time and a short setting time, such as tile adhesive mortars and base surface preparations for buildings.

The inventors have found that a hydraulic composition having a minimal change with time of fluidity (or long pot life) and a short setting time is obtained by combining a component having a set acceleration effect with a water-soluble cellulose ether which is a water-soluble alkyl cellulose or a water-soluble hydroxyalkyl alkyl cellulose or both, and selecting the water-soluble cellulose ether from those having a degree of alkyl substitution of 1.6 to 2.5.

The invention provides a hydraulic composition comprising a setting accelerator, a water-soluble cellulose ether selected from among a water-soluble alkyl cellulose, a water-soluble hydroxyalkyl alkyl cellulose and mixtures thereof, and water. The water-soluble cellulose ether should have a degree of alkyl substitution of 1.6 to 2.5.

In a preferred embodiment, the hydraulic composition further comprises cement and/or gypsum, an aggregate, a fluidizing or dispersing agent as a water-reducing agent, and a defoamer, wherein the composition serves as an SL composition.

In another preferred embodiment, the hydraulic composition further comprises cement and/or gypsum, and an aggregate, wherein the composition serves as a cement mortar composition.

In another aspect, the invention provides a hydraulic composition comprising at least one component selected from among alumina cement, high-early-strength portland cement, ultra-high-early-strength portland cement, and gypsum; a setting retarder; a water-soluble cellulose ether selected from among a water-soluble alkyl cellulose, a water-soluble hydroxyalkyl alkyl cellulose, and mixtures thereof; and water. The water-soluble cellulose ether should have a degree of alkyl substitution of 1.6 to 2.5. The hydraulic composition may further comprise an aggregate, a fluidizing or dispersing agent as a water-reducing agent, and a defoamer, wherein the composition serves as an SL composition.

BENEFITS OF THE INVENTION

The hydraulic compositions of the invention are useful as SL compositions having an excellent self-leveling capability, especially a minimal change with time of fluidity, and a short setting time, and cement mortar compositions having a long open time and a short setting time for use as tile adhesive mortars and base surface preparations for buildings.

DESCRIPTION OF THE PREFERRED EMBODIMENTS

One embodiment of the invention is a hydraulic composition comprising a setting accelerator, a water-soluble cellulose ether selected from the group consisting of a water-soluble alkyl cellulose, a water-soluble hydroxyalkyl alkyl cellulose and mixtures thereof, and water. In a preferred embodiment, the hydraulic composition may further comprise cement and/or gypsum, an aggregate, a water-reducing agent (i.e., fluidizing or dispersing agent), and a defoamer, wherein the composition serves as a self-leveling (SL) composition. Alternatively, the hydraulic composition may further comprise cement and/or gypsum, and an aggregate, wherein the composition serves as a cement mortar composition.

In the hydraulic composition, the setting accelerator is a material capable of accelerating hydration of cement and generally classified into inorganic compounds and organic compounds. Suitable inorganic compounds include chlorides such as calcium chloride and potassium chloride; nitrites such as sodium nitrite and calcium nitrite; nitrates such as sodium nitrate and calcium nitrate; sulfates such as calcium sulfate, sodium sulfate and alum; thiocyanates such as sodium thiocyanate; hydroxides such as sodium hydroxide and potassium hydroxide; carbonates such as calcium carbonate, sodium carbonate and lithium carbonate; and alumina analogs such as water glass, aluminum hydroxide and aluminum oxide. Suitable organic compounds include amines such as diethanolamine and triethanolamine; calcium salts of organic acids such as calcium formate and calcium acetate; and maleic anhydride.

The setting accelerator may be added in amounts of 0.005 to 30 parts, preferably 0.01 to 10 parts, and more preferably 0.02 to 5 parts by weight per 100 parts by weight of the overall system (referring to the total of cement, gypsum and aggregate, hereinafter). On this basis, less than 0.005 pbw of the setting accelerator may fail to hasten the setting time whereas more than 30 pbw may allow for a substantial change of fluidity and fail to provide a desired pot life.

In some embodiments wherein those cements having a fast setting time such as alumina cement having set acceleration effect, high-early-strength portland cement and ultra-high-early-strength portland cement or gypsums such as hemihydrate gypsum and anhydrous gypsum are used, since they themselves have a set acceleration effect, the amount of the setting accelerator added may be reduced depending on the type and amount of cement or gypsum, or even a separate setting accelerator may not be added. Where the set acceleration effect is extremely strong, a setting retarder is preferably used to inhibit rapid hydration.

In the embodiment wherein the hydraulic composition is a SL composition, the water-soluble cellulose ether serves as a thickener and separation inhibitor that inhibits material separation below a certain level while maintaining high fluidity. Its addition in small amounts imparts satisfactory resistance against material separation. In the other embodiment wherein the hydraulic composition is a cement mortar composition such as tile adhesive mortar, the water-soluble cellulose ether serves as a thickener and water-retaining agent that imparts sufficient water retention to the material to inhibit strength lowering due to dry-out, and imparts an appropriate viscosity to the mortar to facilitate trowel working.

The water-soluble cellulose ethers used herein include water-soluble alkyl celluloses and water-soluble hydroxyalkyl alkyl celluloses having a degree of alkyl substitution of 1.6 to 2.5. A typical alkyl cellulose is methyl cellulose (MC). Exemplary hydroxyalkyl alkyl celluloses include hydroxypropyl methyl cellulose (HPMC), hydroxyethyl methyl cellulose (HEMC), and hydroxyethyl ethyl cellulose (HEEC). These celluloses may be used alone or in admixture.

The water-soluble cellulose ether is obtained by reacting cellulose with an etherifying agent such as methyl chloride, propylene oxide or ethylene oxide to substitute alkyl groups for some hydrogen atoms of hydroxyl groups on the cellulose. It becomes water soluble because hydrogen bonds are eliminated. With respect to the substitution, the average number of hydroxyl groups substituted by methoxyl or ethoxyl groups per glucose ring unit on the cellulose is referred to as "degree of substitution," abbreviated as DS; and the average moles of hydroxypropoxyl or hydroxyethoxyl groups added per glucose ring unit on the cellulose is referred to as "molar substitution," abbreviated as MS. For the invention, the former parameter, degree of substitution (DS) is defined. Specifically, the water-soluble cellulose ether has a degree of alkyl substitution (DS) in the range of 1.6 to 2.5, preferably 1.7 to 2.5, and more preferably 1.8 to 2.5. If DS is less than 1.6, a substantial change with time of fluidity occurs, failing to provide a desired pot life. A cellulose ether with a DS of more than 2.5 is difficult to prepare in a commercially and economically acceptable way. It is noted that the molar substitution (MS) of hydroxypropoxyl or hydroxyethoxyl groups is preferably 0.05 to 1.0, more preferably 0.10 to 0.80, and even more preferably 0.15 to 0.70.

Regarding the type of substituent groups introduced into cellulose molecules and the measurement of a degree of substitution and a molar substitution thereof, reference should be made to J. G. Gobler, E. P. Samsel and G. H. Beaber, Talanta, 9, 474 (1962). These parameters can be determined according to the Zeisel-GC method described therein (i.e., a water-soluble cellulose ether is reacted with hydroiodic acid to convert substituent groups in the ether to alkyl iodide, which is quantitatively determined by gas chromatography).

In the attempt to produce a hydraulic composition having a long pot life and a fast setting time, the pot life is first considered. A long pot life is obtained by retarding cement setting. This may be achieved by using a particular water-reducing agent having a retardation effect, a setting retarder or the like, but at the sacrifice of setting time. On the other hand, the setting time may be hastened by using an admixture which is effective for accelerating the setting of cement, such as alumina cement, gypsum or setting accelerator, but at the sacrifice of pot life. When a setting accelerator is combined with a setting retarder, a drawback of difficult control arises. The inventor has reached the conclusion that both the contradictory parameters, pot life and setting time can be met by adding a setting accelerator so as to hasten the setting time and by establishing the state that a temporary delay of hydration due to adsorption of water-soluble cellulose ether to inorganic particles of cement, gypsum or the like, and a temporary mitigation of the set acceleration effect due to interaction between a particular water-soluble cellulose ether and the setting accelerator prevail under the initial hydration conditions.

The water-soluble cellulose ether has a set retardation effect relative to hydraulic substances such as cement, which effect depends its degree of substitution. As the sum of DS and MS is greater, the set retardation effect becomes less. This indicates that when it is desired to increase the pot life like open time, a common practice is to use a water-soluble cellulose ether having a long setting delay time (i.e., having a low DS). Both a long pot life and a short setting time are generally accomplished by a combination of a setting accelerator with a water-soluble cellulose ether having a great set retardation effect (i.e., having a low DS) as described in JP-A 2000-203915 and JP-A 2000-128617.

In contrast, the invention ensures a long pot life and a short setting time using a setting accelerator and a water-soluble cellulose ether having a weak set retardation effect. This is largely attributable to the water-soluble cellulose ether with a high DS which serves to retard hydration reaction and exerts surface active effect. Specifically, it is presumed that a water-soluble cellulose ether with a high DS not only adsorbs to cement to retard its hydration reaction, but also temporarily mitigates the action of a setting accelerator on calcium silicate to increase the pot life. Since this mitigation effect lasts short, the inherent setting effect is little delayed so that the initial setting time becomes hastened. It is generally believed that a drop of fluidity of cement paste is caused, in part, by agglomeration of cement particles. However, a water-soluble cellulose ether with a high DS has a high surface active effect due to its chemical structure, and the surface activation or dispersion effect avoids agglomeration of cement particles.

In the case of SL compositions, the water-soluble cellulose ether should preferably have a viscosity of 5 to 100,000 mPa-s, more preferably 10 to 90,000 mPa-s, and even more preferably 15 to 80,000 mPa-s, as measured in a 2.0 wt % aqueous solution at 20° C. by a Brookfield viscometer at 20 rpm. If the viscosity is less than 5 mPa-s, material separation resistance may be insufficient. If the viscosity is more than 100,000 mPa-s, the SL composition may become too viscous to provide necessary self-leveling properties, its surface may wrinkle to detract from the appearance, and an excessive buildup of viscosity may prevent defoaming by a defoamer, resulting in the formation of bubble craters and a drop of strength.

In the case of cement mortar compositions, the water-soluble cellulose ether should preferably have a viscosity of 100 to 200,000 mPa-s, more preferably 300 to 180,000 mPa-s, and even more preferably 500 to 150,000 mPa-s, as measured in a 2.0 wt % aqueous solution at 20° C. by a Brookfield viscometer at 20 rpm. If the viscosity is less than 100 mPa-s, water retention may be insufficient, failing to provide a sufficient bonding force. If the viscosity is more than 200,000 mPa-s, the amount of water necessary to provide a sufficient plasticity to coat may be increased, resulting in a high water/cement ratio, which may cause a strength drop.

In the case of SL compositions, the water-soluble cellulose ether is preferably added in an amount of 0.02 to 0.5 part, more preferably 0.03 to 0.45 part, and even more preferably 0.04 to 0.4 part by weight per 100 parts by weight of the overall system. If the amount is less than 0.02 pbw, the resulting composition may provide insufficient separation resistance, allowing for occurrence of bleeding, settling down of aggregates, and non-uniform cured strength, and even causing efflorescence and fissure. If the amount is more than 0.5 pbw, the resulting composition may be too viscous and less flowable, detracting from the self-leveling properties which are requisite for the SL composition, its surface may wrinkle to detract from the appearance, and an excessive buildup of viscosity may prevent defoaming by a defoamer, resulting in the formation of bubble craters and a drop of strength.

In the case of cement mortar compositions, the water-soluble cellulose ether is preferably added in an amount of 0.05 to 1.0 parts, more preferably 0.08 to 0.80 part, and even more preferably 0.10 to 0.70 part by weight per 100 parts by weight of the overall system. If the amount is less than 0.05 pbw, water retention may be insufficient, inviting a strength drop due to dry-out. If the amount is more than 1.0 pbw, the amount of water necessary to provide a sufficient plasticity to coat may be increased, resulting in a high water/cement ratio, which may cause a strength drop.

As long as the physical properties of the hydraulic composition are not adversely affected, it is acceptable to use synthetic polymers such as polyvinyl alcohol, polyethylene oxide, polyethylene glycol and polyacrylic amide and naturally derived polymers such as pectin, gelatin, casein, welan gum, gellan gum, locust bean gum, and guar gum.

In the case of SL compositions, water is preferably added in an amount of 15 to 50 parts, more preferably 20 to 45 parts, and even more preferably 22 to 40 parts by weight per 100 parts by weight of the overall system. If the amount of water added is more than 50 pbw, it may cause material separation or a substantial delay of cure. If the amount of water added is less than 15 pbw, necessary self-leveling properties may not be achievable even using a water-reducing agent or the like.

In the case of cement mortar compositions, water is preferably added in an amount of 15 to 40 parts, more preferably 17 to 37 parts, and even more preferably 20 to 35 parts by weight per 100 parts by weight of the overall system. If the amount of water added is more than 40 pbw, it may cause material separation or water retention may be insufficient, resulting in a lower bond strength. If the amount of water added is less than 15 pbw, necessary plasticity may not be achievable, making trowel working difficult.

In addition to the above-described components, the hydraulic composition of the invention may further comprise cement, gypsum, aggregate, water-reducing agent (fluidizing or dispersing agent), defoamer, setting retarder, polymer emulsion and the like.

The cement used herein may be selected from among normal portland cement, high-early-strength portland cement, moderate heat portland cement, portland blast-furnace slug cement, silica cement, fly ash cement, alumina cement, ultra-high-early-strength portland cement, and the like. It is acceptable to replace the cement in part or in entirety by gypsum. The gypsum used herein may be anhydrous gypsum, hemihydrate gypsum or the like. In some cases, dihydrate gypsum may be used.

In one embodiment wherein a cement-based SL composition is prepared using alumina cement having a set acceleration effect, high-early-strength portland cement or ultra-high-early-strength portland cement, it is preferred to additionally use normal portland cement. Preferably high-early-strength portland cement and normal portland cement are mixed in a weight ratio of 100:0 to 1:99, and the other component having a set acceleration effect and normal portland cement are mixed in a weight ratio of 70:30 to 1:99.

In the case of SL compositions, the amount of cement and gypsum added is 15 to 85%, preferably 20 to 80%, and more preferably 25 to 75% by weight of the overall system. If the addition amount is less than 15 wt %, inconveniently the composition may be substantially delayed in setting or even may not set. If the addition amount is more than 85 wt %, inconveniently drying shrinkage or self shrinkage may occur, causing the set surface to craze.

In the case of cement mortar compositions, the amount of cement and gypsum added is 25 to 80%, preferably 30 to 75%, and more preferably 35 to 70% by weight of the overall system. If the addition amount is less than 25 wt %, inconveniently a satisfactory bond strength may not be obtained. If the addition amount is more than 80 wt %, inconveniently drying shrinkage or self shrinkage may occur, causing the set surface to craze.

The aggregates used herein include river sand, mountain sand, sea sand, land sand, crushed sand and other sand which are generally used in the preparation of ready mixed concretes or as plastering fine aggregates. For both the SL and cement mortar compositions, the aggregates have a particle size of up to 5 mm, preferably up to 2 mm, and more preferably up to 1 mm. The lower limit of particle size is preferably at least 0.0001 mm, and more preferably at least 0.001 mm. Too large a particle size may render the SL composition less flowable. With too small a particle size, the amount of water needed may become increased. It is noted that the term "particle size" as used herein is measured by sieve analysis using standard sieves.

In the case of SL compositions, the amount of aggregate added is 15 to 85%, preferably 20 to 80%, and more preferably 25 to 75% by weight of the overall system. If the addition amount is more than 85 wt %, the content of hydraulic substance is reduced so that the composition may be substantially delayed in setting or even may not set. If the addition amount is less than 15 wt %, the content of hydraulic substance is increased so that cracks may generate due to drying shrinkage.

In the case of cement mortar compositions, the amount of aggregate added is 20 to 75%, preferably 25 to 70%, and more preferably 30 to 65% by weight of the overall system. If the addition amount is more than 75 wt %, the content of hydraulic substance is reduced so that the composition may be substantially delayed in setting or even may not set. If the addition amount is less than 20 wt %, the content of hydraulic substance is increased so that cracks may generate due to drying shrinkage.

Any of water-reducing agents (fluidizing or dispersing agents or super plasticizer) may be used herein as long as they are commercially available. Examples include melamine-based, lignin-based, and polycarboxylate-based compounds.

The amount of water-reducing agent added is preferably in a range of about 0.01 to about 5 parts by weight per 100 parts by weight of the overall system. An optimum amount may be determined depending on its type or grade. In the case of SL compositions, the water-reducing agent is used because it is necessary to acquire a good fluidity with a minimal amount of water. If the amount of water-reducing agent used is too small, it may not be effective for its purpose. If the amount of water-reducing agent used is too large, it may cause material separation such as bleeding and aggregate settle-down, leading to a strength drop or efflorescence.

The defoamers used herein include polyether, silicone, alcohol, mineral oil, vegetable oil, and non-ionic surfactants.

The amount of defoamer added is preferably in a range of 0.1 to 5 parts, and more preferably 0.2 to 4 parts by weight per 100 parts by weight of the overall system. If the amount is less than 0.1 pbw, entrained air may not be released, adversely affecting surface quality and even causing a strength drop. If the amount is more than 5 pbw, no further improvement in defoaming effect may be recognized.

In the practice of the invention, a setting retarder may be added, if necessary, to restrain hydration of cement or to retard quick hydration of gypsum. Examples of the setting retarder include hydroxycarboxylic acids such as gluconic acid, citric acid, and glucoheptonic acid, inorganic salts thereof with sodium, potassium, calcium, magnesium and ammonium, saccharides such as glucose, fructose, galactose, saccharose, xylose, arabinose, ribose, oligosaccharide and dextran, and boric acid.

The amount of setting retarder added is preferably in a range of 0.005 to 50 parts by weight per 100 parts by weight of the overall system. Amounts of less than 0.005 pbw may fail to provide the desired pot life when gypsum or the like is used as the hydraulic substance. If the amount is more than 50 pbw, the initial setting time may be substantially prolonged.

In the practice of the invention, a polymer emulsion may be used, if necessary, for improving the adhesion to the body or wear resistance. The polymer emulsion may take the form of liquid or redispersible powder although a liquid polymer emulsion is generally used in the case of SL compositions prepared in plants. Most emulsions that are commercially available as the premix for on-site mixing are polymer emulsions of the powder (redispersible) type. Exemplary polymer emulsions include vinyl acetate resins, vinyl versatate resins, vinyl acetate-vinyl versatate resins, acrylic resins, vinyl acetate-acrylic acid copolymers, vinyl acetate-vinyl versatate-acrylic ester copolymers, and styrene-butadiene copolymers. In the case of SL compositions, they are added for improving durability or the like and for improving surface hardness or the like. In the case of cement mortar compositions such as tile adhesive mortar or building base surface preparations, they serve to increase bond strength.

For both the SL and cement mortar compositions, the amount of polymer emulsion added is preferably in a range of 0.5 to 15 parts and more preferably 0.5 to 10 parts by weight, calculated as solids, per 100 parts by weight of the overall system. If the amount of polymer emulsion added is less than the range, it may fail to achieve the desired durability and bonding force. If the amount of polymer emulsion added is more than the range, there may be a likelihood of air entrainment, resulting in drawbacks such as damaged surface appearance and a strength drop.

The hydraulic composition of the invention may be prepared by combining the above-specified components, and particularly when an SL composition is intended, by combining cement and/or gypsum, aggregate, water reducing agent (fluidizing or dispersing agent), defoamer, setting accelerator, water-soluble cellulose ether and optional other components, and when a cement mortar composition is intended, by combining cement and/or gypsum, aggregate, setting accelerator, water-soluble cellulose ether and optional other components, mixing them uniformly, adding water thereto, and further mixing.

Where the composition of the invention is used as an SL composition, it is applied by casting under gravity or by pumping. Where the composition is used as a cement mortar composition, it is applied by trowel coating or pump spraying.

EXAMPLE

Examples of the invention are given below by way of illustration and not by way of limitation. The term "pbw" is parts by weight.

Examples 1 to 11 and Comparative Examples 1 to 7

I. Cement-Based SL Composition

<Components Used>

| Cement A: | normal portland cement (Taiheiyo Cement Corp.) 45 pbw |
| Cement B: | normal portland cement (Taiheiyo Cement Corp.) 25 pbw + high-early-strength portland cement (Taiheiyo Cement Corp.) 20 pbw |
| Aggregate: | (1) Silica sand (0.07-0.6 mm) 25 pbw (2) Silica sand (0.05-0.1 mm) 30 pbw |
| Setting accelerator: | Calcium formate (setting accelerator A) Lithium carbonate (setting accelerator B) Sodium nitrite (setting accelerator C) Calcium chloride (setting accelerator D) |
| Setting retarder: | Sodium gluconate (reagent grade) |
| Polymer emulsion: | DM2072 P (redispersible powdered resin, Nichigo-Mowinyl Co., Ltd.) 1.5 pbw |
| Water-reducing agent: | Coaflow NF-100 (Taiheiyo Material Corp.) 0.5 pbw |
| Defoamer: | SN-14HP (San Nopco Ltd.) 0.15 pbw |
| Water-soluble cellulose ether: | listed in Table 1, 0.1 pbw |
| Water: | 28 pbw |

II. Gypsum-Based SL Composition

<Components Used>

| Gypsum: | calcined gypsum (commercial) 51 pbw |
| Inorganic powder: | calcium carbonate powder (commercial) 20 pbw calcium hydroxide powder (commercial) 1 pbw |
| Aggregate: | (1) Silica sand (0.07-0.6 mm) 18 pbw (2) Silica sand (0.05-0.1 mm) 10 pbw |
| Setting retarder: | Sodium citrate (reagent grade) |
| Water-reducing agent: | Coaflow NF-100 (Taiheiyo Material Corp.) 1 pbw |
| Defoamer: | SN-14HP (San Nopco Ltd.) 0.20 pbw |
| Water-soluble cellulose ether: | listed in Table 1, 0.1 pbw |
| Water: | 43 pbw |

TABLE 1

| | Water-soluble cellulose ether | DS | MS | Viscosity of 2 wt % aqueous solution (mPa-s) | Set delay time (min) |
|---|---|---|---|---|---|
| Example 1 | HPMC | 1.6 | 0.15 | 29,500 | 65 |
| Example 2 | HPMC | 1.7 | 0.16 | 29,300 | 50 |
| Example 3 | HPMC | 1.8 | 0.15 | 30,100 | 38 |
| Example 4 | HPMC | 2.0 | 0.25 | 30,200 | 20 |
| Example 5 | HPMC | 2.2 | 0.26 | 29,000 | 18 |
| Example 6 | HPMC | 2.5 | 0.28 | 28,000 | 12 |
| Example 7 | HEMC | 1.7 | 0.30 | 29,000 | 35 |

TABLE 1-continued

| | Water-soluble cellulose ether | DS | MS | Viscosity of 2 wt % aqueous solution (mPa-s) | Set delay time (min) |
|---|---|---|---|---|---|
| Example 8 | MC | 1.7 | — | 28,500 | 73 |
| Example 9 | HEEC | 1.8 | 0.15 | 29,700 | 39 |
| Example 10 | HPMC | 2.0 | 0.25 | 30,150 | 20 |
| Example 11 | HPMC | 1.8 | 0.15 | 30,100 | 38 |
| Comparative Example 1 | HPMC | 1.4 | 0.20 | 27,500 | 93 |
| Comparative Example 2 | HEMC | 1.5 | 0.20 | 29,000 | 71 |
| Comparative Example 3 | MC | 1.5 | — | 30,100 | 125 |
| Comparative Example 4 | HPMC | 1.7 | 0.16 | 29,300 | 50 |
| Comparative Example 5 | HPMC | 1.4 | 0.20 | 27,500 | 98 |
| Comparative Example 6 | HEEC | 1.4 | 0.15 | 27,700 | 108 |
| Comparative Example 7 | HPMC | 1.4 | 0.20 | 27,500 | 93 |

HPMC: hydroxypropyl methyl cellulose
HEMC: hydroxyethyl methyl cellulose
MC: methyl cellulose
HEEC: hydroxyethyl ethyl cellulose <Measurement of DS and MS>

The degree of substitution (DS) and the molar substitution (MS) of water-soluble cellulose ether were measured according to the Zeisel-GC method described in J. G. Gobler, E. P. Samsel and G. H. Beaber, Talanta, 9, 474 (1962).

<Measurement of Viscosity>

The viscosity of water-soluble cellulose ether was measured in the form of a 2.0 wt % aqueous solution thereof at 20° C. by a Brookfield viscometer at 20 rpm.

<Evaluation of Set Delay Time>

The set delay time of water-soluble cellulose ether was determined as a difference between the setting time of plain cement (without water-soluble cellulose ether) and the setting time of normal portland cement having 0.2 wt % of water-soluble cellulose ether added thereto. The setting time of plain cement is determined by a twin conduction micro-calorimeter that monitors the heat release from cement paste (water/cement ratio 1.0) for observing a change with time thereof. This is based on average values of the initial and final setting times of normal portland cement having such a plain value that the maximum heat peak time with $C_3S$ is about 162 minutes, as measured according to the cement setting test method of JIS R-5201.

<Preparation>

A 5-liter mortar mixer was filled with a predetermined volume of water. With stirring, a predetermined amount of a pre-blend of the above-specified components (powder) excluding water was added. Mixing continued for 3 minutes, yielding cement and gypsum based SL compositions.

Table 2 shows the division between cement based compositions I and gypsum based compositions II, the type and amount of setting accelerator, and the amount of setting retarder.

TABLE 2

| | Type of hydraulic substance | Type of setting accelerator | Amount of setting accelerator (pbw) | Amount of setting retarder (pbw) |
|---|---|---|---|---|
| Example 1 | Cement A | A | 2.0 | 0 |
| Example 2 | Cement A | A | 2.0 | 0 |

TABLE 2-continued

| | Type of hydraulic substance | Type of setting accelerator | Amount of setting accelerator (pbw) | Amount of setting retarder (pbw) |
|---|---|---|---|---|
| Example 3 | Cement A | B | 2.5 | 0 |
| Example 4 | Cement A | C | 3.0 | 0 |
| Example 5 | Cement A | D | 1.0 | 0 |
| Example 6 | Cement A | A | 2.0 | 0 |
| Example 7 | Cement A | A | 2.0 | 0 |
| Example 8 | Cement A | A | 2.0 | 0 |
| Example 9 | Cement A | A | 2.0 | 0 |
| Example 10 | Gypsum | — | 0 | 0.075 |
| Example 11 | Cement B | A | 1.0 | 0 |
| Comparative Example 1 | Cement A | A | 2.0 | 0 |
| Comparative Example 2 | Cement A | A | 2.0 | 0 |
| Comparative Example 3 | Cement A | A | 2.0 | 0 |
| Comparative Example 4 | Cement A | — | 0 | 0 |
| Comparative Example 5 | Cement A | — | 0 | 0.5 |
| Comparative Example 6 | Cement A | — | 0 | 0 |
| Comparative Example 7 | Gypsum | — | 0 | 0 |

These compositions were tested by the following methods, with the results shown in Table 3.

<Test Methods>

1. SL Flow Test (According to JASS 15M 103)

A cylinder having an inner diameter of 50 mm and a height of 51 mm standing on a glass plate was filled with an SL composition and then lifted off, whereupon the SL composition spread on the glass plate. The diameter of the spreading SL composition was measured.

2. SL Composition Temperature

The temperatures of respective components were adjusted so that the SL composition as mixed was at a temperature of 20±3° C.

3. Change with Time of Fluidity

According to JASS 15M 103, a cylindrical vessel (flow vessel) having an inner diameter of 50 mm and a height of 51 mm was filled with a SL composition, which was held for a certain time before a flow value was measured. The lapse of time was 60 minutes. A flow ratio is the flow value after a lapse of time of 60 minutes divided by the flow value immediately after filling (0 minute). A flow ratio closer to 1.0 suggests an SL composition experiencing a less change with time of fluidity. Those compositions having a flow ratio of 0.75 or higher are judged satisfactory.

4. Initial Setting Time (According to JIS A-6204, Annex 1)

A cylindrical or box metal vessel having an inner diameter or short side of at least 150 mm and an inner height of at least 150 mm was filled with an SL composition and held in a chamber at a temperature of 20±3° C. and a humidity of at least 80%. Using an indentation resistance tester having a hydraulic or spring means for applying a drive force to a needle, an indentation resistance value was measured. The initial setting time is the time passed until the indentation resistance value reached 3.5 N/mm$^2$.

TABLE 3

| | Flow value (mm) | Temperature (° C.) | Flow ratio | Initial setting time (min) |
|---|---|---|---|---|
| Example 1 | 208 | 20.5 | 0.77 | 241 |
| Example 2 | 208 | 21.0 | 0.80 | 235 |
| Example 3 | 211 | 21.1 | 0.85 | 223 |
| Example 4 | 215 | 20.7 | 0.88 | 220 |
| Example 5 | 213 | 20.5 | 0.87 | 218 |
| Example 6 | 210 | 21.1 | 0.87 | 221 |
| Example 7 | 205 | 22.0 | 0.81 | 233 |
| Example 8 | 207 | 21.0 | 0.80 | 213 |
| Example 9 | 208 | 21.5 | 0.78 | 230 |
| Example 10 | 217 | 20.7 | 0.76 | 115 |
| Example 11 | 210 | 21.2 | 0.79 | 210 |
| Comparative Example 1 | 203 | 20.7 | 0.45 | 315 |
| Comparative Example 2 | 201 | 20.5 | 0.40 | 330 |
| Comparative Example 3 | 200 | 21.0 | 0.41 | 335 |
| Comparative Example 4 | 213 | 21.5 | 0.60 | 378 |
| Comparative Example 5 | 218 | 21.0 | 0.70 | 447 |
| Comparative Example 6 | 211 | 22.0 | 0.37 | 355 |
| Comparative Example 7 | 213 | 22.3 | 0.20 | 33 |

As shown in Table 3, when water-soluble cellulose ethers having a DS within the specified range according to the invention are used, the flow ratio representative of a change with time of fluidity is equal to or higher than 0.75, indicating a minimal change with time of fluidity or a long pot life. The initial setting time is as fast as 245 minutes or less.

By contrast, in Comparative Examples 1 to 3 using water-soluble cellulose ethers having a DS of less than 1.6, the flow ratio representative of a change with time of fluidity is equal to or lower than 0.45, indicating a substantial change with time of fluidity or a short pot life. The initial setting time is slow due to the set retardation effect of these water-soluble cellulose ethers.

Comparative Example 4, which is free of setting accelerator, shows a flow ratio and an initial setting time which are below the acceptable level. Comparative Example 5, in which the setting accelerator is omitted and instead, a setting retarder is added to gain a pot life, shows a flow ratio and an initial setting time which are below the acceptable level.

Comparative Example 6 using a water-soluble cellulose ether having a DS of less than 1.6 shows a low flow ratio. Comparative Example 7, which is an exemplary gypsum based SL composition, shows a low flow ratio because the setting retarder is omitted.

Examples 12 to 20 and Comparative Examples 8 to 11

III. Cement Mortar Composition (Tile Adhesive Mortar)

<Components Used>

| | |
|---|---|
| Cement: | normal portland cement (Taiheiyo Cement Corp.) 50 pbw |
| Aggregate: | (1) Silica sand (0.07-0.6 mm) 25 pbw |
| | (2) Silica sand (0.05-0.1 mm) 25 pbw |
| Setting accelerator: | Calcium formate (setting accelerator A) |
| | Lithium carbonate (setting accelerator B) |
| | Sodium nitrite (setting accelerator C) |
| | Calcium chloride (setting accelerator D) |
| Setting retarder: | Sodium gluconate (reagent grade) |
| Water-soluble cellulose ether: | listed in Table 4, 0.2 pbw |
| Water: | 23 pbw |

TABLE 4

| Water-soluble cellulose ether | | DS | MS | Viscosity of 2 wt % aqueous solution (mPa-s) | Set delay time (min) |
|---|---|---|---|---|---|
| Example 12 | HPMC | 1.6 | 0.15 | 29,500 | 65 |
| Example 13 | HPMC | 1.7 | 0.16 | 29,300 | 50 |
| Example 14 | HPMC | 1.8 | 0.15 | 30,100 | 38 |
| Example 15 | HPMC | 2.0 | 0.25 | 30,200 | 20 |
| Example 16 | HPMC | 2.2 | 0.26 | 29,000 | 18 |
| Example 17 | HPMC | 2.5 | 0.28 | 28,000 | 12 |
| Example 18 | HEMC | 1.7 | 0.30 | 29,000 | 35 |
| Example 19 | HEEC | 1.8 | 0.15 | 29,700 | 39 |
| Example 20 | MC | 1.7 | — | 28,500 | 73 |
| Comparative Example 8 | HPMC | 1.4 | 0.20 | 27,500 | 93 |
| Comparative Example 9 | HEMC | 1.7 | 0.30 | 29,000 | 35 |
| Comparative Example 10 | HPMC | 1.7 | 0.16 | 29,300 | 50 |
| Comparative Example 11 | HEEC | 1.4 | 0.15 | 27,700 | 108 |

HPMC: hydroxypropyl methyl cellulose
HEMC: hydroxyethyl methyl cellulose
HEEC: hydroxyethyl ethyl cellulose
MC: methyl cellulose It is noted that the degree of substitution (DS), molar substitution (MS), viscosity and set delay time are determined as in the foregoing Examples.

<Preparation>

Predetermined amounts of the above-specified components (powder) excluding water were pre-blended. A 5-liter mortar mixer was filled with the pre-blend and operated for 1 minute for dry mixing. With stirring, a predetermined volume of water was added. Mixing continued for 3 minutes, yielding cement mortar compositions.

Table 5 shows the type and amount of setting accelerator, and the amount of setting retarder.

TABLE 5

| | Type of hydraulic substance | Type of setting accelerator | Amount of setting accelerator (pbw) | Amount of setting retarder (pbw) |
|---|---|---|---|---|
| Example 12 | Cement | A | 2.0 | 0 |
| Example 13 | Cement | B | 2.5 | 0 |
| Example 14 | Cement | C | 3.0 | 0 |
| Example 15 | Cement | D | 1.0 | 0 |
| Example 16 | Cement | A | 2.0 | 0 |
| Example 17 | Cement | A | 2.0 | 0 |
| Example 18 | Cement | A | 2.0 | 0 |
| Example 19 | Cement | A | 2.0 | 0 |
| Example 20 | Cement | A | 2.0 | 0 |
| Comparative Example 8 | Cement | A | 2.0 | 0 |
| Comparative Example 9 | Cement | — | 0 | 0 |
| Comparative Example 10 | Cement | — | 0 | 0.5 |
| Comparative Example 11 | Cement | A | 2.0 | 0 |

These compositions were tested by the following methods, with the results shown in Table 6.

<Test Methods>

1. Table Flow Test (According to JIS A-5201)

A flow test instrument consisting of a flow table and a flow cone was used. The flow cone is a frustoconical vessel having a top diameter of 70 mm, a bottom diameter of 100 mm and a height of 60 mm. The flow cone was filled with a mortar composition and then lifted off. The flow table was then subjected to 15 falling motions within 15 seconds. The diameter of the spreading mortar was measured, which represents a table flow.

2. Tile Adhesive Mortar Temperature

The temperatures of respective components were adjusted so that the tile adhesive mortar as mixed was at a temperature of 20±3° C.

3. Water Retention Test (According to JIS A-6916)

A filter paper having a diameter of 11 cm was rested on a glass plate, and a ring having an inner diameter of 50 mm, a height of 10 mm and a thickness of 3 mm was placed on the paper. A mortar was admitted within the ring, on which another glass plate was rested. The assembly was turned up side down. It was held for 60 minutes, during which water oozed out into the filter paper. The diameter of the oozing water spot was measured. A water retention is computed from the inner diameter of the ring frame and the spread of water.

4. Consistency Change Test

A table flow value was measured after a certain time according to JIS A-6916. The lapse of time was 60 minutes. A percent consistency change relative to the initial value was computed by substituting the measured values in the mathematical expression prescribed in JIS A-6916. A percent consistency change equal to or less than 5% is satisfactory.

5. Open Time

According to JIS A-6916, a tile adhesive mortar was applied onto a commercial calcium silicate plate to a coating buildup of 4 mm. A piece of tile was placed on the coating, and a steel pressure plate was pressed thereon for pressure attachment so that the mortar bedding became 2 mm thick. Immediately thereafter, the tile was separated off, and the amount of mortar deposit on tile back lugs was measured. The measurement was repeated after 20 minutes from the mortar application.

A percent mortar deposit change was computed according to the equation:

$$AD = [(AD_0 - AD_{20})/AD_0] \times 100$$

wherein AD is a mortar deposit change (%), $AD_0$ is an initial mortar deposit, and $AD_{20}$ is a mortar deposit after 20 minutes. A mortar deposit change equal to or higher than 70% is satisfactory.

6. Initial Setting Time (According to JIS A-6204, Annex 1)

The initial setting time was measured as in the foregoing Examples of SL compositions.

TABLE 6

| | Table flow (mm) | Temperature (° C.) | Water retention (%) | Consistency change (%) | Mortar deposit change (%) | Initial setting time (min) |
|---|---|---|---|---|---|---|
| Example 12 | 175 | 22.8 | 91.0 | 3.9 | 87.3 | 345 |
| Example 13 | 173 | 22.2 | 90.5 | 3.7 | 88.5 | 346 |
| Example 14 | 176 | 22.1 | 90.7 | 3.0 | 89.7 | 337 |
| Example 15 | 169 | 21.5 | 88.5 | 2.0 | 91.9 | 320 |
| Example 16 | 170 | 21.7 | 89.0 | 1.3 | 93.0 | 313 |
| Example 17 | 169 | 20.5 | 90.0 | 1.1 | 94.5 | 308 |
| Example 18 | 171 | 20.7 | 91.0 | 0.2 | 94.3 | 307 |
| Example 19 | 165 | 21.3 | 87.7 | 4.0 | 87.0 | 365 |
| Example 20 | 168 | 21.5 | 85.0 | 3.0 | 86.0 | 377 |
| Comparative Example 8 | 171 | 22.1 | 88.0 | 22.5 | 60.4 | 172 |
| Comparative Example 9 | 170 | 20.9 | 89.0 | 25.0 | 68.6 | 703 |

TABLE 6-continued

|  | Table flow (mm) | Temperature (° C.) | Water retention (%) | Consistency change (%) | Mortar deposit change (%) | Initial setting time (min) |
|---|---|---|---|---|---|---|
| Comparative Example 10 | 168 | 21.0 | 88.7 | 1.6 | 85.6 | 995 |
| Comparative Example 11 | 175 | 22.3 | 85.5 | 27.3 | 55.5 | 497 |

As seen from Table 6, when water-soluble cellulose ethers having a DS within the specified range according to the invention are used, the consistency change representative of a change with time of plasticity is equal to or less than 4%, and the mortar deposit change which is a simple measurement of an open time is equal to or more than 86%, indicating a long pot life. The initial setting time is as fast as 377 minutes or less.

By contrast, in Comparative Example 8 using a water-soluble cellulose ether having a DS of less than 1.6, the consistency change representative of a change with time of plasticity is as low as 22.5%, indicating a short pot life, and the mortar deposit change is as low as 60.4%. Comparative Example 9, which is free of setting accelerator, shows a consistency change, a mortar deposit change and an initial setting time which are below the acceptable level. Comparative Example 10, in which the setting accelerator is omitted and instead, a setting retarder is added to gain a pot life, shows an initial setting time which is below the acceptable level. Comparative Example 11 using a water-soluble cellulose ether having a DS of less than 1.6 shows a consistency change and a mortar deposit change which are below the acceptable level.

Examples 21 to 24 and Comparative Example 12

IV. Cement Mortar Composition (Building Base Surface Preparation)

<Components Used>

| Cement: | normal portland cement (Taiheiyo Cement Corp.) 70 pbw |
|---|---|
| Aggregate: | (3) Silica sand (0.05-0.20 mm) 10 pbw |
|  | (4) Silica sand (0.05-0.15 mm) 15 pbw |
|  | (5) Calcium carbonate powder (0.05-0.15 mm) 5 pbw |
| Setting accelerator: | Calcium formate (setting accelerator A) |
|  | Lithium carbonate (setting accelerator B) |
| Water-soluble cellulose ether: | listed in Table 7, 0.25 pbw |
| Water: | 27 pbw |

TABLE 7

| Water-soluble cellulose ether | DS | MS | Viscosity of 2 wt % aqueous solution (mPa·s) | Set delay time (min) |
|---|---|---|---|---|
| Example 21 | HPMC | 1.6 | 0.15 | 29,500 | 65 |
| Example 22 | HEMC | 1.7 | 0.30 | 29,000 | 35 |

TABLE 7-continued

| Water-soluble cellulose ether | DS | MS | Viscosity of 2 wt % aqueous solution (mPa·s) | Set delay time (min) |
|---|---|---|---|---|
| Example 23 | HEEC | 1.8 | 0.15 | 29,700 | 39 |
| Example 24 | MC | 1.7 | — | 28,500 | 73 |
| Comparative Example 12 | HPMC | 1.4 | 0.20 | 27,500 | 93 |

HPMC: hydroxypropyl methyl cellulose
HEMC: hydroxyethyl methyl cellulose
HEEC: hydroxyethyl ethyl cellulose
MC: methyl cellulose It is noted that the degree of substitution (DS), molar substitution (MS), viscosity and set delay time are determined as in the foregoing Examples.

<Preparation>

Predetermined amounts of the above-specified components (powder) excluding water were pre-blended. A 5-liter mortar mixer was filled with the pre-blend and operated for 1 minute for dry mixing. With stirring, a predetermined volume of water was added. Mixing continued for 3 minutes, yielding cement mortar compositions.

Table 8 shows the type and amount of setting accelerator.

TABLE 8

|  | Type of hydraulic substance | Type of setting accelerator | Amount of setting accelerator (pbw) |
|---|---|---|---|
| Example 21 | Cement | A | 2.0 |
| Example 22 | Cement | B | 2.5 |
| Example 23 | Cement | A | 2.0 |
| Example 24 | Cement | B | 2.5 |
| Comparative Example 12 | Cement | A | 2.0 |

These compositions were tested by the following methods, with the results shown in Table 9.

<Test Methods>

1. Table Flow Test (According to JIS A-5201)

A flow test instrument consisting of a flow table and a flow cone was used. The flow cone is a frustoconical vessel having a top diameter of 70 mm, a bottom diameter of 100 mm and a height of 60 mm. The flow cone was filled with a mortar composition and then lifted off. The flow table was then subjected to 15 falling motions within 15 seconds. The diameter of the spreading mortar was measured, which represents a table flow.

2. Building Base Preparation Temperature

The temperatures of respective components were adjusted so that the building base surface preparation as mixed was at a temperature of 20±3° C.

3. Water Retention Test (According to JIS A-6916)

A filter paper having a diameter of 11 cm was rested on a glass plate, and a ring having an inner diameter of 50 mm, a height of 10 mm and a thickness of 3 mm was placed on the paper. A mortar was admitted within the ring, on which another glass plate was rested. The assembly was turned up side down. It was held for 60 minutes, during which water oozed out into the filter paper. The diameter of the oozing water spot was measured. A water retention is computed from the inner diameter of the ring frame and the spread of water.

4. Consistency Change Test

A table flow value was measured after a certain time according to JIS A-6916. The lapse of time was 60 minutes. A percent consistency change relative to the initial value was computed by substituting the measured values in the mathematical expression prescribed in JIS A-6916. A percent consistency change equal to or less than 7% is satisfactory.

5. Initial Setting Time (According to JIS A-6204, Annex 1)

The initial setting time was measured as in the foregoing Examples of SL compositions.

TABLE 9

|  | Table flow (mm) | Temperature (° C.) | Water retention (%) | Consistency change (%) | Initial setting time (min) |
|---|---|---|---|---|---|
| Example 21 | 170 | 22.5 | 89.0 | 2.5 | 410 |
| Example 22 | 167 | 21.2 | 90.1 | 4.1 | 390 |
| Example 23 | 168 | 21.1 | 89.5 | 4.5 | 397 |
| Example 24 | 171 | 22.0 | 88.7 | 5.7 | 425 |
| Comparative Example 12 | 170 | 22.0 | 88.0 | 20.5 | 433 |

As seen from Table 9, when water-soluble cellulose ethers having a DS within the specified range according to the invention are used, the consistency change representative of a change with time of plasticity is equal to or less than 6%, indicating a long pot life. The initial setting time is as fast as 425 minutes or less.

By contrast, in Comparative Example 12 using a water-soluble cellulose ether having a DS of less than 1.6, the consistency change representative of a change with time of plasticity is as low as 20.5%, indicating a short pot life.

Japanese Patent Application No. 2007-038220 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A hydraulic composition serving as a self-leveling composition comprising
   cement and/or gypsum,
   an aggregate,
   a setting accelerator,
   a water-soluble cellulose ether selected from the group consisting of a water-soluble alkyl cellulose, a water-soluble hydroxyalkyl alkyl cellulose and mixtures thereof, said water-soluble cellulose ether having a degree of alkyl substitution of 1.6 to 2.5, and
   water in an amount of 28 to 50 parts by weight per 100 parts by weight of the total of cement, gypsum and aggregate,
   the hydraulic composition having a flow ratio of at least 0.75.

2. The hydraulic composition of claim 1, further comprising a fluidizing or dispersing agent as a water-reducing agent, and a defoamer.

3. A hydraulic composition serving as a self-leveling composition comprising
   at least one component selected from the group consisting of alumina cement, high-early-strength portland cement, ultra-high-early-strength portland cement, and gypsum,
   an aggregate,
   a setting retarder,
   a water-soluble cellulose ether selected from the group consisting of a water-soluble alkyl cellulose, a water-soluble hydroxyalkyl alkyl cellulose, and mixtures thereof, said water-soluble cellulose ether having a degree of alkyl substitution of 1.6 to 2.5, and
   water in an amount of 28 to 50 parts by weight per 100 parts by weight of the total of cement, gypsum and aggregate,
   the hydraulic composition having a flow ratio of at least 0.75.

4. The hydraulic composition of claim 3, further comprising a fluidizing or dispersing agent as a water-reducing agent, and a defoamer, wherein the composition serves as a self-leveling composition.

* * * * *